United States Patent [19]

Nakatsu et al.

[11] Patent Number: 4,887,254
[45] Date of Patent: Dec. 12, 1989

[54] OPTICAL DISK DRIVE DEVICE FOR POSITIONING A CARRIAGE TO A RETRACT POSITION

[75] Inventors: Keiji Nakatsu; Katsuaki Kamitsu; Masaharu Ogawa, all of Hyogo, Japan

[73] Assignee: Mitsubishi Denki Kabushiki Kaisha, Tokyo, Japan

[21] Appl. No.: 172,525

[22] Filed: Mar. 24, 1988

[30] Foreign Application Priority Data

Jun. 12, 1987 [JP] Japan .................. 62-145163

[51] Int. Cl.$^4$ .................. G11B 7/00; G11B 21/08
[52] U.S. Cl. .................. 369/33; 360/78.04; 360/72.1; 360/78.14; 369/41
[58] Field of Search .................. 358/342; 369/32, 33, 369/43, 44, 46, 50, 41; 360/72.1, 78.01, 78.04–78.06, 78.12, 78.13, 78.14, 101, 105, 106, 107

[56] References Cited

U.S. PATENT DOCUMENTS 4,611,315  9/1986  Ogino .................. 360/78.04 X
4,698,702 10/1987  Miyake .................. 360/78.04 X Primary Examiner—Robert L. Richardson
Attorney, Agent, or Firm—Sughrue, Mion, Zinn, Macpeak & Seas

[57] ABSTRACT

A retract device includes a signal instruction circuit for providing the number of tracks to be traversed, the access start instruction, and the retract instruction and the reference voltage generating circuit responsive to these instructions to provide the residual track number and the carriage moving signal and operates such that, immediately before the drive device is to stop operating a carriage having an optical head mounted thereon is moved by an access operation from a track to a first predetermined position according to the access start instruction, and is then moved from the first predetermined position to a second predetermined position according to the retract instruction at a predetermined reference speed.

19 Claims, 2 Drawing Sheets

OPTICAL DISK DRIVE DEVICE FOR POSITIONING A CARRIAGE TO A RETRACT POSITION

BACKGROUND OF THE INVENTION

The present invention relates to an optical disk driving device for recording or reproducing information on a rotating optical disk by means of an optical system and, particularly, to such a device for storing the optical disk in a predetermined position reliably immediately before the device stops operating.

FIG. 4 is a block circuit diagram of a conventional magnetic disk drive device such as shown in pages 1426 to 1432, Mitsubishi Denki Giho, vol. 46, No. 12, Dec., 1972, wherein reference numeral 40 depicts a linear motor coil for moving a magnetic head (not shown) to an aimed track of a magnetic information storage disk (not shown), and 41 is a speed sensor for magnetically detecting the speed of movement of the linear motor (not shown) driven by the coil 40.

A linear motor control circuit 42 for controls the speed of the linear motor on the basis of a preset reference speed and the output of the speed sensor 41 and provides an output applied to the linear motor coil 40.

Reference numeral 43 is a switch circuit having a selection terminal A connected to a junction between the linear motor control circuit 42 and the linear motor coil 40, 44 is a power source connected to a selection terminal B of the switch circuit 43, and 45 is a capacitor connected to a common terminal C of the switch circuit.

In operation, when the power source 44 is connected in circuit, the common terminal C is connected to the selection terminal B and therefore the capacitor 45 is charged thereby.

At this time, a normal access operation is performed by driving the magnetic head facing the magnetic disk. First, the speed sensor 41 detects the speed of the linear motor and inputs the detected speed to the linear motor control circuit 42. The latter supplies a signal indicative of a difference between the preset reference speed and the detected speed to the linear motor coil 40 so that the detected speed is controlled on the basis of the reference speed. Thus, the linear motor coil 40 drives the linear motor at the preset reference speed and positions the magnetic heas at the aimed or target track of the magnetic disk.

When the power source is disconnected from the magnetic disk device, a carriage mounting the magnetic head is returned from a track of the magnetic disc to a track "00" thereof, and moved to a predetermined storage or reset position. This function is generally called a "retract function".

Under an abnormal situation such as a power source malfunction or a malfunction of the commercial power line, the common terminal C in the switch circuit 43 is connected to the selection terminal A to supply energy stored in the capacitor 45 to the linear motor coil 40 so that the linear motor implements the retract function. Any damage due to contact between the magnetic disk and the magnetic head is thus prevented. A similar retract function is also provided in conventional optical disk drive devices.

FIG. 5 is a side view of an access mechanism of a conventional optical disk drive device. In FIG. 5, an optical information recording disk 1 is adapted to rotate around a rotary shaft 1a and has a spiral track or coaxial tracks thereon with a predetermined constant gap therebetween.

An optical head 2 is adapted to direct an optical beam to a recording surface of the disk and receive reflections for recording and reproducing information with respect to the disk. Reference numeral 3 depicts a carriage for mounting the optical head 2 and moving it to an aimed track address, and 4 a linear actuator magnetic circuit for moving the carriage 3 radially of the optical disk 1. The linear actuator corresponds to the linear motor of the magnetic disk drive device.

Reference numerals 5 and 6 depict inner and outer peripheral stoppers for determining the innermost and an outermost positions of the movement range of the carriage 3, respectively, 7 is an innermost track position accessible by the optical head 2, and 8 is a retract position which is inside of the innermost position 7 and at which the carriage 3 is to be locked.

The positioning of the optical head 2 with respect to the tracks on the optical disk 1 is performed similarly to the magnetic disk drive device. In this case, however, it is necessary to prevent mechanical shocks due to the fact that sensitive optical part such as objective lenses are used, and to lock the carrige 3 mounting the optical head 2 thereon when the device is stopped. Therefore, the optical head 2 is moved to the retract position 8 and stored thereat by the retract function of a capacitor 45.

The retract position 8 is at the end of the movable range of the linear actuator, and it is inside of the innermost position 7 as shown in FIG. 5. Therefore, it is impossible to move the carriage 3 to the retract position 8 by the normal access operation to the tracks on the optical disk 1 because there is no address for the retract position.

Therefore, the carriage 3 is firstly moved to the innermost position 7 for which an address exists by the usual access operation, and is then forcibly moved to the retract position 8 by the charged energy of the capacitor 45.

Due to the fact that, in the retract operation, the capacitor 45 is used to move the carriage 3 from the innermost position 7 to the retract position 8, the capacitor 45 must be large enough to store the energy necessary to achieve such operation, which is usually large when an undesired tilting of the whole device is taken into consideration. This fact makes the whole device large in size. Further, since the carriage 3 is moved to the retract position 8 forcibly, mechanical shock necessarily results which reduces the reliability of the functioning of the optical head 2.

SUMMARY OF THE INVENTION

According to the present invention, an optical disk drive device includes a retract means composed of a signal instruction circuit providing the total number of tracks to be moved thereacross, an access start instruction and a retract instruction and a reference voltage generating circuit responsive to these instructions to provide the number of tracks left unpassed yet and a carriage moving signal.

In the present invention, the carriage mounting the optical head is moved from any track to the first predetermined position by the access operation upon the access start instruction and from the first predetermined position to the second predetermined position at a predetermined reference speed upon the retract instruction, immediately before the device is stopped to operate.

DETAILED DESCRIPTION OF THE PREFERRED EMBODIMENT

Figure 1:
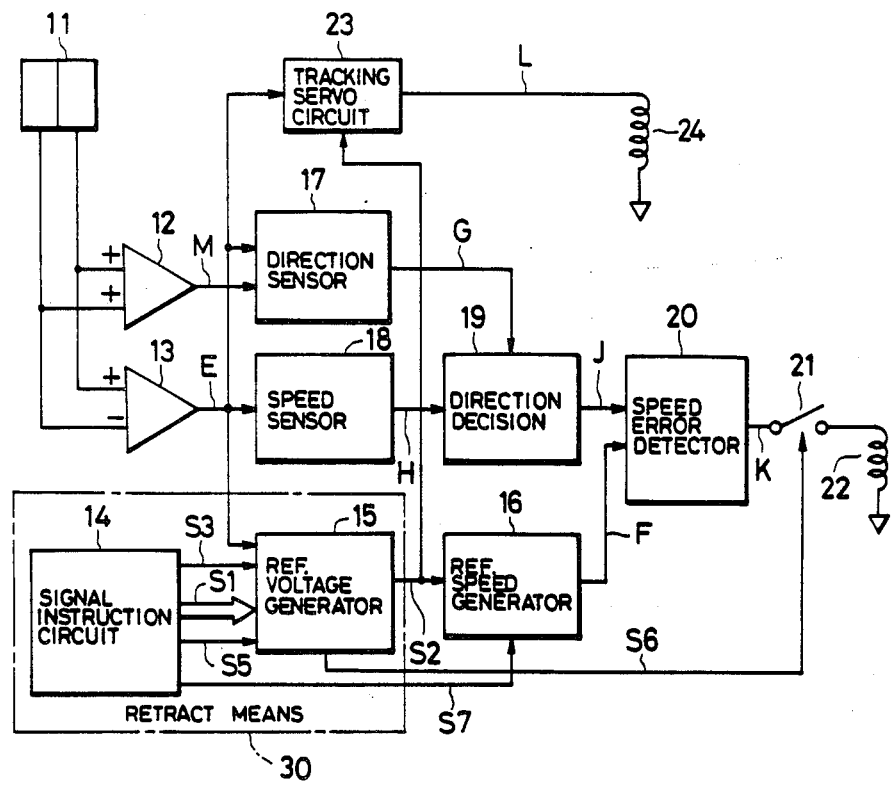
FIG. 1 is a block circuit diagram showing an embodiment of the present invention.
Figure 4:
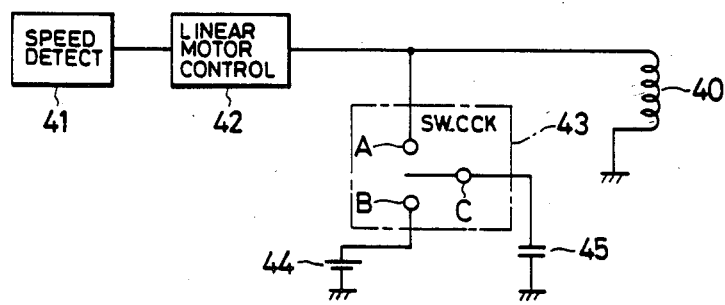
FIG. 4 is a block diagram of a conventional magnetic disk drive device.

In FIG. 1 which shows an embodiment of the present invention and includes an access mechanism similar to that shown in FIG. 4 although not shown, reference numeral 11 depicts two divided photo detectors for sensing tracks of an optical disk 1 to be traversed across, and 12 and 13 are an adder amplifier and a subtractor amplifier for providing a sum signal M and a difference signal E from output signals of the optical sensor 11, respectively.

A retract means 30 is constituted with a signal instruction circuit 14 for providing a number S1 of tracks to be transversed, an access start instruction S3, a retract instruction S5, and a moving direction instruction S7 which are necessary to move a carriage 3, and a reference voltage generating circuit 15 responsive to the difference signal E, the number S1 of tracks to be traversed, the access start instruction S3 and the retract instruction S5 to provide a number S2 of tracks still untraversed and a carriage moving signal S6.

Reference numeral 16 depicts a reference speed generating circuit responsive to the number S2 and the moving direction instruction S7 to provide a reference speed F, 17 a direction detector responsive to a phase difference between the sum signal M and the difference signal E to provide an actual moving direction G of the optical head 2, 18 a speed detector responsive to a frequency of the difference signal E to provide an actual moving speed H of the optical head 2, 19 a direction decision circuit responsive to the moving direction G and the moving speed H to provide a relative speed J having an extreme value, 20 a speed error detector responsive to a difference between the relative speed J and the reference speed F to provide a speed error K for a linear actuator (not shown), 21 a switch circuit connected to an output side of the speed error detector 20 and adapted to be turned on and off selectively by the carriage moving signal S6 and 22 a linear actuator coil to which the speed error K is supplied through the switch circuit 21.

A reference numeral 23 depicts a tracking servo circuit responsive to the difference signal E and the track number S2 to provide a servo signal L for driving a tracking actuator (not shown) and 24 is a tracking actuator coil to which the servo signal L is supplied.

Figure 2:
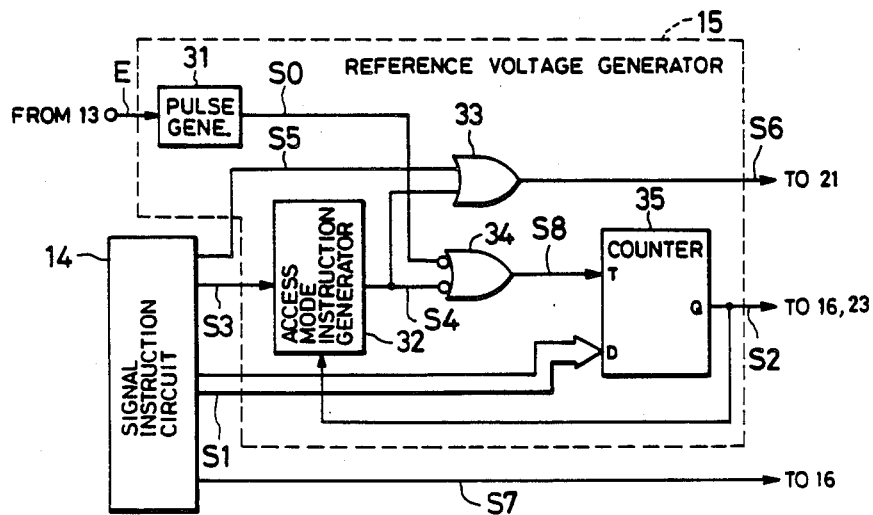
FIG. 2 is a detailed block diagram of a reference voltage generating circuit in FIG. 1.

FIG. 2 is a block diagram showing the reference voltage generating circuit 15 of the retract means 30 in FIG. 1, in detail. The reference voltage generating circuit 15 includes a pulse generator 31 for converting the difference signal E into a pulse signal S0 for track counting, as access mode instruction generator 32 responsive to the access start instruction S3 and the residual track number S2 to provide an access mode instruction S4, an OR gate 33 for providing a logical sum of the retract instruction S5 and the access mode instruction S4 to provide a carriage moving signal S6, a NAND gate 34 for providing a logical product of the pulse signal S0 and the access mode instruction S4 and a counter 35 responsive to the total track number S1 and an output S8 of the NAND gate 34 to provide the residual track number S2.

Figure 3:
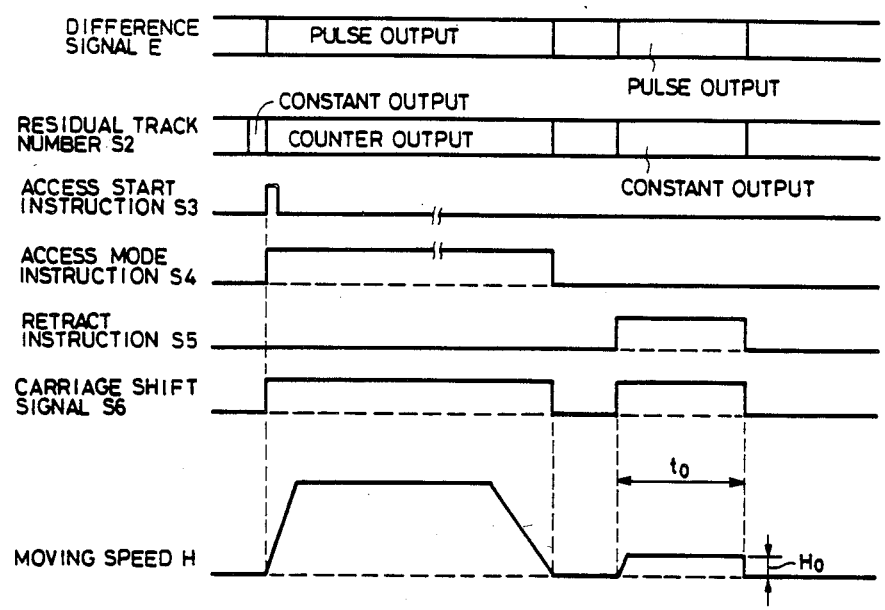
FIG. 3 is a timing chart showing the operation of the present invention.
Figure 5:
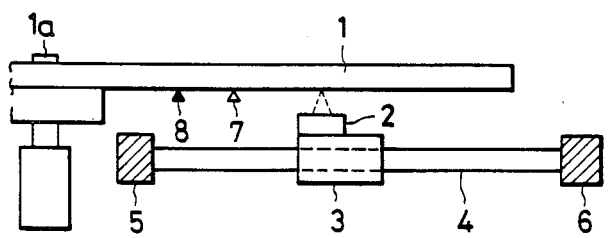
FIG. 5 is a side view of an access mechanism of a conventional optical disk drive device.

An operation of the embodiment shown in FIGS. 1 and 2 will be described with reference to a timing chart shown in FIG. 3 and FIG. 5.

When the optical disc 1 is irradiated with laser beam from a laser diode of the optical head 2, a reflection beam from the optical disk 1 is detected by the divided optical detector 11 from which the track transverse signal is obtained.

When a power source of the optical disk drive device is connected during a normal operation, the tracking actuator is driven and controlled by the servo signal L from the tracking servo circuit 23 to trace a desired track of the optical disk 1 with a light beam.

In case where the optical disk drive device is stopped to operate in order to, for example, move the optical disk from the device, the carriage 3 on which the optical head 2 is mounted is moved to the first predetermined position 7 and then from the first predetermined position to the second predetermined position 8.

In case where the operation of the drive device is to be stopped while the optical beam is tracking a track on the optical disk 1, the signal instruction circuit 14 calculates the number S1 of tracks indicative of an amount of movement from an address position to the first predetermined position 7 and supplies a result to a data input terminal D of the counter 35. Simultaneously therewith, the signal instruction circuit 14 supplies the moving direction S7 of the reference speed output to the reference speed generator 16.

Since, in this case, the linear actuator is not actuated, the difference signal E can not be supplied to the reference voltage generating circuit 15. Therefore, the initially stored track number S1 is provided at an output terminal Q of the counter 35 as the residual track number S2.

Then, when the signal instruction circuit 14 provides the access start instruction S3, the access mode instruction generator 32 provides an access mode instruction S4 which is in high level indicative of a state where an access is being performed. This access mode instruction S4 becomes, through the OR gate 33, a carriage moving signal S6 upon which the switch circuit 21 is turned on.

When the switch 21 is closed, the linear actuator coil 22 is energized, upon which the operation mode is switched from the tracking mode in which a light beam tracks the optical disk, 1 to the speed control mode in which the carriage 3 is moved under the speed control of the linear actuator. Therefore, the reference speed generator 16 provides the reference speed F having a polarity determined by the initially inputted moving direction S7 and a value determined by the residual track number S2.

In the initial stage of operation, the moving speed H of the linear actuator, i.e., the optical head 2 is zero. Therefore, the relative speed J is also zero, so that the speed error K is determined by the reference speed F, which is supplied through the switch circuit 21 to the linear actuator coil 22.

Therefore, the linear actuator is actuated to start the carriage 3 to move toward the first predetermined position 7. With the movement of the carriage 3, the light beam moves, upon which the two divided photo detectors 11 provide two signals having different phases and are indicative of the light beam traversing the tracks. These signals are used by the adder amplifier 12 and the subtractor amplifier 13 to provide the sum signal M and the difference signal E.

The direction detection circuit 17 responds to a difference in phase between the sum signal M and the difference signal E and provides the moving direction G of the carriage 3, and the speed detection circuit 18 responds to the frequency of the differene signal E and provides the moving speed H of the carriage 3, i.e., the light beam as an absolute value. The moving direction G and the moving speed H are supplied to the direction decision circuit 19. The direction decision circuit 19 determines the polarlity of the moving speed H on the basis of the moving direction G and converts the moving speed H into the relative speed J which is supplied to the error detection circuit 20.

On the other hand, the pulse generator 31 of the reference voltage generator 15 responds to the difference signal E to provide the pulse signal S0, one pulse per track, which is supplied through the NAND gate 34 to a count input terminal T of the counter 35. The counter 35 counts down the pulse signal S0 corresponding to the tracks traversed sequentially from the previously stored track number S1 and provides the residual track number S2 at each down-count. That is, as shown in FIG. 3, the residual track number S2 is provided as the counter output according to the pulse output of the difference signal E. The reference speed generating circuit 16 determines the reference speed F having a value corresponding to the residual track number S2 and a polarity based on the moving direction S7, which is supplied to the speed error detection circuit 20.

The speed error detection circuit 20 provides the speed error K on the basis of a difference between the relative speed J and the reference speed F, which is supplied through the switch circuit 21 to the liner actuator coil 22. Thus, the moving speed H of the beam is controlled so that it follows the reference speed F corresponding to the residual track number S2. The moving speed H varies as shown in FIG. 3, (i.e., the closer the carriage 3 is to the first predetermined position 7, the smaller the value of the moving speed H).

The residual track number S2 is supplied to the access mode instruction generating circuit 32 which detects a point of time at which a seek operation is completed (when the residual track number S2 becomes zero) and, simultaneously, changes the access mode instruction S4 to a low level. Therefore, the NAND gate 34 prohibits a passage of the pulse signal S0 therethrough to stop the down-count operation of the counter 35 and to turn the carriage moving signal S6 from the OR gate 33 to a low level, thereby opening the switch circuit 21.

The tracking servo circuit 23 to which the residual track number S2 is supplied provides the servo signal L on the basis of the difference signal E after the completion of the seek operation upon the access, and supplies the signal L to the tracking actuator coil 24. By making the light beam follow the optical disk 1 at the first predetermined position 7, the completion of the access operation to the first predetermined position 7 is confirmed.

In order to move the carriage 3 from the first predetermined position 7 to the second predetermined position 8 at a constant speed, the signal instruction circuit 14 supplies the moving track number S1 corresponding to a predetermined reference speed Ho to the counter 35 so that the residual track number S2 becomes constant, and, simultaneously, changes the retract instruction S5 from a low level to a high level. The predetermined reference speed Ho, in this case, should be selected such that it does not adversely affect the optical head 2 when the carriage 3 reaches a storage mechanism (not shown) provided in the second predetermined position 8.

The retract instruction S5 from the signal instruction circuit 14 is passed through the OR gate 33 and is provided at the output of the gate as the carriage moving signal S6, by which the switch circuit 21 is closed. Therefore, the linear actuator is actuated again and the operation is switched from the tracking mode to the speed control mode. Since, at this time, there is no pulse signal S0 at the count input terminal T and so there is no count operation, the residual track number S2 is always constant and thus the reference speed F produced by the reference speed generator circuit 16 is constant. Thus, the linear actuator is controlled at a constant speed and the moving speed H of the carriage 3 becomes the predetermined reference speed Ho, as shown in FIG. 3.

The retract signal S5 based on, for example, a disk eject instruction is preset such that it becomes a low level at a point of time after a predetermined time to corresponding to a distance from the first predetermined position 7 to the second predetermined position 8. Therefore, when the time to lapses, the switch circuit 21 is opened to stop the retract operation and the carriage 3 reaches the second predetermined position 8 and is stored in the storage mechanism therein. Thus, the retract operation for the optical head 2 is completed.

Although, in the described embodiment, the first predetermined position 7 is set on the innermost track of the accessible range with respect to the optical disk 1, it may set in the outermost accessible track. In such a case, the second predetermined position in which the carriage 3 is to be stored may be set in the side of the outermost stopper 6.

The first predetermined position 7 may be set, not in the innermost track, but in any place outside the innermost track so long as the latter is accessible.

The linear actuator is described for driving the optical head 2. However, it is possible to use any other actuator for the same purpose.

As described hereinbefore, according to the present invention, the retract means comprises the signal instruction circuit for providing the number of tracks to be traversed, the access start instruction and the retract instruction and the reference voltage generating circuit is responsive to these instructions to provide the residual track number and the carriage moving signal, and operates such that, immediately before the drive device is to stop operating, the carriage mounting the optical head thereon is moved by the access operation from any track to the first predetermined position according to the access start instruction, and then is moved from the first predetermined position to the second predetermined position according to the retract instruction at a predetermined reference speed. Therefore, a time required to store the optical head is minimized, it is not necessary to provide a large capacitor, mechanical shock to the optical head is minimized and thus it is possible to make the optical disk drive device compact and reliable.

What is claimed is:

1. An optical disk drive device for positioning a carriage (3) having mounted thereon an optical head (2) for emitting a light beam onto an optical disk and for receiving the light beam after it is reflected by the optical disk (1), the optical disk having a plurality of tracks for storing information, the optical disk drive device comprising:

an actuator (4) for moving the carriage in a radial direction relative to the optical disk so as to traverse the tracks;

a speed sensor (18) for sensing a moving speed of the carriage according to the received reflected light by the optical head when the carriage is moved by said actuator;

a signal instruction circuit (14) for outputting a track traverse signal (S1) representing a number of tracks to be traversed by said actuator, an access start instruction signal (S3) for initiating a carriage access operation, and a retract instruction signal (S5) for initiating a carriage retract operation;

a reference voltage generator (15), connected to receive the track traverse signal, the access start instruction signal and the retract instruction signal, for outputting a residual track number signal (S2) representing the number of tracks remaining to be traversed by the carriage;

a reference speed generating circuit (16), connected to receive the residual track number signal from said reference voltage generator, for outputting a reference speed signal (F) according to the residual track number signal; and a speed error detection signal (20) for comparing the sensed carriage moving speed with the outputted reference speed signal, and for outputting a speed error signal (K) according to the comparison;

said reference voltage generator generating a first carriage moving signal, in response to the access start instruction signal, for allowing the carriage to be moved from a present track position on the optical disk to a first predetermined position in accordance with the outputted speed error signal, said reference voltage generator generating a second carriage moving signal in response to the outputted retract instruction signal for allowing the carriage to move from the first predetermined position to a second predetermined position in accordance with the speed error signal, the speed error signal being constant when the carriage is moved from the first to the second predetermined position.

2. The optical disk drive device as claimed in claim 1, wherein said reference voltage generating circuit comprises a pulse generator for generating a pulse signal in accordance with the reflected light beam, an access mode instruction generating circuit responsive to said access start instruction signal and said residual track number signal, to provide an access mode instruction signal (S4), an OR gate for providing a logical sum of said retract instruction signal and said access mode instruction signal, a NAND gate for providing a logical product of said pulse signal and said access mode instruction signal, a counter circuit having a count input terminal and a data input terminal, the count input terminal being supplied with an output of said NAND gate, and the data input terminal being supplied with the track traverse signal, the output of said counter being the residual track number signal.

3. The optical disk device as claimed in claim 1, wherein the speed error signal is varied when the carriage is moved from the present track position to the first predetermined position.

4. The optical disk device as claimed in claim 1, wherein said signal instruction circuit outputs the retract instruct signal after the access mode instruction signal is outputted.

5. The optical disk device as claimed in claim 1, further comprising a linear actuator coil 22 for controlling said actuator and a switch 21 connected between the output of said speed error detection circuit and said linear actuator coil, said switch being closed in response to said first and second carriage moving signals so that said linear actuator coil receives the output of said speed error detection signal only during said first and second carriage moving signals.

6. The optical disk drive device as claimed in claim 1 or 2, wherein said signal instruction circuit outputs said retract instruction signal for a predetermined period of time.

7. The optical disk drive device as claimed in claim 6, wherein the first predetermined position is an innermost track of tracks on said optical disk, and the second predetermined position is a retract position disposed inside of the first predetermined position relative to the optical disk.

8. The optical disk drive device as claimed in claim 7, wherein said actuator for moving said carriage comprises a linear actuator.

9. The optical disk drive device as claimed in claim 7, wherein said retract instruction signal is outputted in response to a disk eject instruction for ejecting the optical disk.

10. The optical disk drive device as claimed in claim 6, wherein the first predetermined position is an outermost track of tracks of the optical disk, and the second predetermined position is a retract position disposed outside of the first predetermined position relative to the optical disk.

11. The optical disk drive device as claimed in claim 6, wherein said actuator for moving said carriage comprises a linear actuator.

12. The optical disk drive device as claimed in claim 6, wherein said retract instruction signal is outputted in response to a disk eject instruction for ejecting the optical disk.

13. The optical disk drive device as claimed in claim 1 or 2, wherein said first predetermined position is an innermost track of tracks on the optical disk, and the second predetermined position is a retract position disposed inside of the first predetermined position relative to the optical disk.

14. The optical disk drive device as claimed in claim 13, wherein said actuator for moving said carriage comprises a linear actuator.

15. The optical disk drive device as claimed in claim 13, wherein said retract instruction signal is outputted in response to a disk eject instruction for ejecting the optical disk.

16. the optical disk drive device as claimed in claim 1 or 2, wherein the first predetermined position is an outermost track of tracks of the optical disk, and the second predetermined position is a retract position disposed outside of the first predetermined position relative to the optical disk.

17. The optical disk drive device as claimed in claim 16, wherein said retract instruction signal is outputted in response to a disk eject instruction for ejecting the optical disk.

18. The optical disk drive device as claimed in claim 1 or 2, wherein said actuator for moving said carriage comprises linear actuator.

19. The optical disk drive device as claimed in claim 1 or 2, wherein said retract instruction signal is outputted in response to a disc eject instruction for ejecting the optical disk.

* * * * *